US012350700B2

(12) United States Patent
Weber et al.

(10) Patent No.: US 12,350,700 B2
(45) Date of Patent: Jul. 8, 2025

(54) SWITCHING DEVICE, DEPOSITION DEVICE COMPRISING THE SWITCHING DEVICE, METHOD FOR SWITCHING A FLUID FLOW, AND METHOD FOR DEPOSITING PARTICLES ONTO A SUBSTRATE

(71) Applicant: VSPARTICLE HOLDING B.V., Delft (NL)

(72) Inventors: Katharina Weber, Delft (NL); Max Koole, Delft (NL); Tobias Vincent Pfeiffer, Delft (NL)

(73) Assignee: VSPARTICLE HOLDING B.V., Delft (NL)

( * ) Notice: Subject to any disclaimer, the term of this patent is extended or adjusted under 35 U.S.C. 154(b) by 581 days.

(21) Appl. No.: 17/424,106

(22) PCT Filed: Jan. 16, 2020

(86) PCT No.: PCT/NL2020/050023
§ 371 (c)(1),
(2) Date: Jul. 19, 2021

(87) PCT Pub. No.: WO2020/149741
PCT Pub. Date: Jul. 23, 2020

(65) Prior Publication Data
US 2022/0097086 A1 Mar. 31, 2022

Related U.S. Application Data

(60) Provisional application No. 62/793,511, filed on Jan. 17, 2019.

(30) Foreign Application Priority Data

Jan. 17, 2019 (NL) ...................... 2022412

(51) Int. Cl.
B05B 12/18 (2018.01)
B05B 7/00 (2006.01)
B05B 7/12 (2006.01)

(52) U.S. Cl.
CPC ............. *B05B 7/12* (2013.01); *B05B 7/0012* (2013.01); *B05B 12/18* (2018.02)

(58) Field of Classification Search
CPC ............ B05B 7/12; B05B 12/18; B82Y 40/00
See application file for complete search history.

(56) References Cited

U.S. PATENT DOCUMENTS 3,866,567 A 2/1975 Fritzschz
6,833,028 B1 12/2004 Scheer et al.
(Continued)

FOREIGN PATENT DOCUMENTS

JP S5748352 A 3/1982
JP 2010048352 A 3/2010
(Continued)

OTHER PUBLICATIONS

Search Report and Written Opinion from corresponding Netherlands Application No. NL2022412, Sep. 18, 2019.
(Continued)

*Primary Examiner* — Qingzhang Zhou
(74) *Attorney, Agent, or Firm* — Workman Nydegger

(57) ABSTRACT

A switching device is provided for switching the flow of a fluid. The switching device includes a fluid conduit including a first inlet for said fluid and a first outlet, a first switching fluid conduit including a second inlet for a switching fluid, the first switching fluid conduit being in fluid connection with the fluid conduit at a first position between the first inlet and the first outlet, an exhaust conduit including a second outlet, the exhaust conduit being in fluid connection with the fluid conduit at a second position
(Continued)

between the first inlet and the first position, and a control device. The switching device further includes a second switching fluid conduit in fluid connection with the exhaust conduit and the first switching fluid conduit. The control device controls the flow of the switching fluid into the first switching fluid conduit and/or the second switching fluid conduit.

27 Claims, 4 Drawing Sheets

(56) References Cited

U.S. PATENT DOCUMENTS

2005/0287308 A1 12/2005 Becker et al.
2007/0227536 A1 10/2007 Rivera et al.

FOREIGN PATENT DOCUMENTS

| WO | WO-03011755 A1 * | 2/2003 | ............. B82Y 30/00 |
| WO | 2019094979 A1 | 5/2019 | |

OTHER PUBLICATIONS

International Search Report and Written Opinion from PCT Application No. PCT/NL2020/050023, Jul. 6, 2020.

* cited by examiner

SWITCHING DEVICE, DEPOSITION DEVICE COMPRISING THE SWITCHING DEVICE, METHOD FOR SWITCHING A FLUID FLOW, AND METHOD FOR DEPOSITING PARTICLES ONTO A SUBSTRATE

BACKGROUND

The invention relates to a switching device, a deposition device, in particular a deposition device for depositing structured material, more in particular a deposition device configured for using an aerosol jet, comprising the switching device, a method for switching a fluid flow, and a method for depositing particles onto a substrate.

US 2005/0287308 discloses a method for producing nanoparticles and nanostructured films. In US 2005/0287308 an apparatus for performing laser ablation of microparticles is shown. The apparatus comprises an aerosol feed source for providing microparticles in an aerosol form, a laser ablation chamber in which the microparticles are moved through a laser beam to produce a nanoparticle aerosol, and a deposition module for collecting nanoparticles. The deposition module comprises a nozzle, and an impaction substrate within a vacuum impaction chamber. The nanoparticles are impacted on the impaction substrate. The impaction substrate can be moved under the nozzle to control the deposition of nanoparticles into films and lines.

To form more complex patterns it is necessary to temporarily switch the flow of nanoparticles passing through the nozzle on and off.

US 2005/0287308 describes to use electric fields for deflecting those nanoparticles that are left charged by the laser beam.

SUMMARY OF THE INVENTION

A disadvantage of the use of electric fields for deflecting the nanoparticles is, that these electric fields only act on charged nanoparticles. Uncharged nanoparticles cannot be deflected by electric fields.

Alternatively, the aerosol feed source and/or the laser ablation apparatus can be switched on and off for controlling local deposition of nanoparticles. A disadvantage of switching the aerosol feed source and/or the laser ablation apparatus is that, after switching on, it takes some time before the flow of the nanoparticle aerosol becomes constant and stable according to desired specifications thereof. This in itself slows down the deposition process. Furthermore the flow of the nanoparticle aerosol that is generated between switching on the laser ablation apparatus and the moment that the flow becomes constant and stable negatively influences the properties and consistency of the nanoparticle films and lines that are deposited on the impaction substrate.

It is an object of the present invention to provide for a switching device, a deposition device comprising the switching device, a method for switching a fluid flow, and a method for depositing particles onto a substrate that addresses at least one of the problems described above.

According to a first aspect, the invention provides a switching device for switching the flow of a fluid, wherein the switching device comprises:
a fluid conduit comprising a first inlet for said fluid and a first outlet,
a first switching fluid conduit comprising a second inlet for a switching fluid, which first switching fluid conduit is configured in fluid connection with the fluid conduit at a first position between the first inlet and the first outlet,
an exhaust conduit comprising a second outlet, which exhaust conduit is configured in fluid connection with the fluid conduit at a second position between the first inlet and the first position, and
a control device configured for controlling the flow of the switching fluid into the fluid conduit
wherein the switching device further comprises a second switching fluid conduit which is configured in fluid connection with the exhaust conduit and the first switching fluid conduit, wherein the control device is configured for controlling the flow of the switching fluid into the first switching fluid conduit and/or the second switching fluid conduit.

In a first condition of the control device, the control device is configured to substantially block a flow of the switching fluid into the fluid conduit, and the switching device is configured such that the switching fluid flows from the second inlet, via the first switching fluid conduit, via the second switching conduit, into the exhaust conduit and to the second outlet. Accordingly, in use, substantially no switching fluid flows into the fluid conduit at the first position. In this first condition of the control device, the fluid is allowed to flow from the first inlet, via the fluid conduit to the first outlet. Preferably, the flow of the switching fluid is used to influence the pressure in the exhaust conduit and thereby guiding the fluid in the fluid conduit to flow from the first inlet to the first outlet and/or to optimize the flow conditions of the fluid.

In a second condition of the control device, the control device is configured to allow a flow of the switching fluid into the fluid conduit, and the switching device is configured such that the switching fluid flows from the second inlet, via the first switching fluid conduit, into the fluid conduit and to the first outlet. Accordingly, in use, switching fluid is allowed to flow from the second inlet via the first switching fluid conduit into the fluid conduit. In this second condition the switching fluid in the fluid conduit forces the fluid to flow from the first inlet into the exhaust conduit and to the second outlet. In the second condition the switching fluid in the fluid conduit forces the fluid to flow from the first inlet into the exhaust conduit to the second outlet.

By switching the control device between the first condition and the second condition the switching device switches the flow of the fluid from the first outlet to the second outlet and vice versa, while allowing the fluid to continuously flow. As the fluid continuously flows, the properties thereof are substantially constant and stable, also immediately after switching.

Within the present application, an aerosol is defined as a suspension system of solid particles or liquid droplets in a gas. The solid particles or liquid droplets of the aerosol is also referred herein as the aerosol particles. When the first output is connected to a nozzle for depositing aerosol particles onto a substrate, the fluid comprising the aerosol particles, can be switched on and off, without interruption of the flow of the fluid. This results in a consistent flow of the fluid through the nozzle and an improved deposition on the target.

In an embodiment the first switching fluid conduit debouches, preferably directly, into the fluid conduit. According to this embodiment, switching fluid exiting the first switching fluid conduit directly enters the fluid conduit and, thus, directly contacts the fluid flowing within the fluid conduit. So, during use, substantially no time passes during the switching fluid exiting the first switching fluid conduit and entering the fluid conduit. As a result, a delay between bringing the control device from the first condition to the second condition and the switching fluid entering the fluid conduit is kept to a minimum.

In an embodiment, the control device has a first condition, in which the control device is configured for substantially preventing a flow of fluid to enter the fluid conduit at the first position, and a second condition, in which the control device is configured to allow a flow of the switching fluid into the fluid conduit. During use of the switching device, when the control device is in the first condition thereof, substantially no fluid or no fluid, such as a sheath fluid or sheath gas, enters the fluid conduit at the first position, such that only fluid is flowing through the fluid conduit from the first inlet thereof to the first outlet thereof. The properties of the fluid flow through the fluid conduit, therefore, substantially depend only on the fluid conduit, resulting in a fluid flow which can be controlled and/or regulated relatively simple.

In a further embodiment the control device comprises a valve. Preferably, the valve is configured to control and switch the flow of switching fluid in a controlled and reliable manner.

In an embodiment a first distance along the fluid conduit between the first outlet and the first position is smaller than 10 cm, preferably between 0.2 and 10 cm, more preferably between 0.5 and 2 cm. A small first distance results in a shorter delay period between the moment of switching the switching device to stop fluid flowing through the first output and the moment fluid actually stops flowing from the first output. Shorter delay periods allow for more rapid switching and more accurate depositing of particles.

In an embodiment a second distance along the fluid conduit between the first outlet and the second position is smaller than 20 cm, preferably between 0.2 and 20 cm, more preferably between 0.2 and 2 cm. A small second distance results in a shorter delay period between the moment of switching the switching device to start fluid flowing through the first output and the moment fluid actually starts flowing from the first output. Shorter delay periods allow for more rapid switching and more accurate depositing of particles.

According to a second aspect, the invention provides a deposition device, wherein the deposition device comprises a nozzle for directing an aerosol stream, in particular an aerosol jet, onto a target, and a switching device or an embodiment thereof as described above, wherein the nozzle is arranged in fluid connection to the first outlet. The switching device of the deposition device can switch the aerosol stream on and off, and thereby control the flow of the aerosol stream through the nozzle. On and off switching of the aerosol stream through the nozzle allows to control the deposition of the aerosol material on the target. Controlling the deposition of the aerosol material while moving the nozzle with respect to the target, allows to deposit the aerosol particles in a desired pattern onto the target.

In an embodiment the deposition device further comprises a source for the aerosol stream, wherein the source for the aerosol stream is arranged in fluid connection to the first inlet. Because of the switching device or an embodiment thereof as described above, the source of the aerosol stream can continuously and uninterruptedly supply the aerosol stream. The switching device does not influence the aerosol stream from the source. In use, the aerosol can keep flowing from the source before, during and after switching the switching device. The switching device is configured to either direct the aerosol stream to the nozzle, or otherwise to direct the aerosol stream to the second outlet.

In an embodiment, the particle size of the aerosol particles in the aerosol stream is smaller than 100 nm, and preferably smaller than 10 nm. In an embodiment, the deposition device is configured for depositing features onto the target, wherein a feature size of the deposited features is smaller than 1 mm, and preferably is smaller than 100 µm.

In an embodiment the deposition device further comprises a source for a switching fluid, wherein the source for the switching fluid is arranged in fluid connection to the second inlet. The source of the switching fluid supplies the switching fluid to the deposition device.

In an embodiment the switching fluid and/or the aerosol comprises a gas, preferably a substantially inert gas, preferably nitrogen or argon gas. An inert gas does not react with the particles contained in the aerosol stream and/or the substrate, and therefore accommodate a reliable and stable aerosol stream. Preferably, the aerosol and the switching fluid comprise the same gas or a gas with similar fluid dynamic properties. The fluid dynamic properties comprises one or more of a viscosity, ratio of heat capacity ($\gamma=c_p/c_v$), and density, for example.

In an embodiment the deposition device further comprises a filtering device, wherein the filtering device is arranged in fluid connection with the exhaust conduit. The filtering device is configured to filter out substances from the aerosol stream and/or the switching fluid. In particular, the filtering device is configured to filter any fluid that is to be discharged out of the second outlet to the environment. Optionally, the filtering device may be used to filter out substances for re-use thereof.

In an embodiment the deposition device comprises multiple nozzles, each arranged in fluid connection to the first outlet of the switching device or each arranged in fluid connection to the first outlet of a corresponding switching device. By using multiple nozzles the deposition device can deposit aerosol particles onto multiple locations on the target or on multiple targets while using one source for the aerosol stream. When the nozzles are connected to the first outlet of the switching device the deposition device can deposit particles simultaneously. When each nozzle is connected to the first outlet of a corresponding switching device the deposition device can deposit particles independently from each other.

In an embodiment the fluid conduit comprises multiple first outlets, the first switching fluid conduit is arranged in fluid connection with the fluid conduit at multiple first positions between corresponding first outlets and the first inlet, and each of the multiple nozzles is arranged in fluid connection to one of the multiple first outlets. In this arrangement the multiple nozzles of the deposition device can deposit aerosol particles onto multiple locations on the target or on multiple targets while using one source of the aerosol stream simultaneously.

It is respectfully noted that each of the switching device according to the first aspect of the invention and the deposition device according to the second aspect of the invention does not comprise a sheath fluid supply, in particular a sheath gas supply, for providing a sheath fluid to the fluid conduit.

According to a third aspect, the invention provides a method for switching the flow of a fluid with the use of a switching device or an embodiment thereof as described above, wherein the method comprises the steps of:

supplying said fluid to the first inlet, and guiding the fluid from the first inlet, via the fluid conduit to the first outlet, controlling the control device to allow the switching fluid to flow into the fluid conduit, thereby guiding the switching fluid from the second inlet, via the first switching fluid conduit, via the fluid conduit, at least partially to the first outlet, and guiding the fluid from the first inlet, via the fluid conduit, via the exhaust conduit, at least partially to the second outlet, wherein the method further comprises the step of guiding the switching fluid from the second inlet, via the first switching fluid conduit, via the second switching fluid conduit, via the exhaust conduit, to the second outlet.

The method for switching the flow of a fluid and its embodiments relate to the practical implementation of the switching device according to the aforementioned embodiments and thus have the same technical advantages, which will not be repeated hereafter. It is however noted, that the control device may be controlled in order to gradually increase or decrease the flow of switching fluid into the fluid conduit. Such a gradual increase or decrease can be used to obtain a smooth transition during the switching of the fluid between the first outlet and the second outlet, or vice versa.

Furthermore, since the control device can be controlled for guiding the fluid at least partially to the second outlet, the method can also be used for dilution of the fluid, in particular the aerosol. For example, the control device can be arranged to introduce only a reduced or partial flow of switching fluid from the second inlet into the fluid conduit, which switching fluid can mix with the aerosol (fluid) and produces a diluted aerosol which is at least partially guided to the first outlet.

In an embodiment the method further comprises the step of guiding the switching fluid from the second inlet, via the switching fluid conduit, at least partially via the exhaust conduit, to the second outlet. This step can for example be established by configuring the pressure of the fluid and/or the switching fluid, such that the switching fluid exits both through the first and second outlet. When the switching fluid exits both through the first and second outlet, the switching fluid not only blocks the fluid to travel to the first outlet, the switching fluid actively pushes the fluid towards the second outlet.

According to a fourth aspect, the invention provides a method for depositing aerosol particles onto a target with the use of a deposition device or an embodiment thereof as described above, wherein the method comprises the steps of:
 supplying an aerosol to the first inlet, guiding the aerosol from the first inlet, via the fluid conduit, via the first outlet, through the nozzle onto said target,
 controlling the control device to allow the switching fluid to flow into the fluid conduit, and thereby guiding the switching fluid from the second inlet, via the first switching fluid conduit, via the fluid conduit at least partially to the first outlet, and guiding the aerosol from the first inlet, via the fluid conduit, via the exhaust conduit, at least partial to the second outlet,
 wherein the method further comprises the step of guiding the switching fluid from the second inlet, via the first switching fluid conduit, via the second switching fluid conduit, via the exhaust conduit, to the second outlet.

The method for depositing aerosol particles onto a target and its embodiments relate to the practical implementation of the depositing device according to the aforementioned embodiments and thus have the same technical advantages, which will not be repeated hereafter.

In an embodiment the method further comprises the step of guiding the switching fluid from the second inlet, via the switching fluid conduit, at least partially via the exhaust conduit, to the second outlet.

It is respectfully noted that each of the method for switching the flow of a fluid according to the third aspect of the invention, and the method for depositing aerosol particles onto a target according to the fourth aspect of the invention does not comprise a step of surrounding the flow of fluid within the fluid conduit with a sheath fluid, in particular sheath gas.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
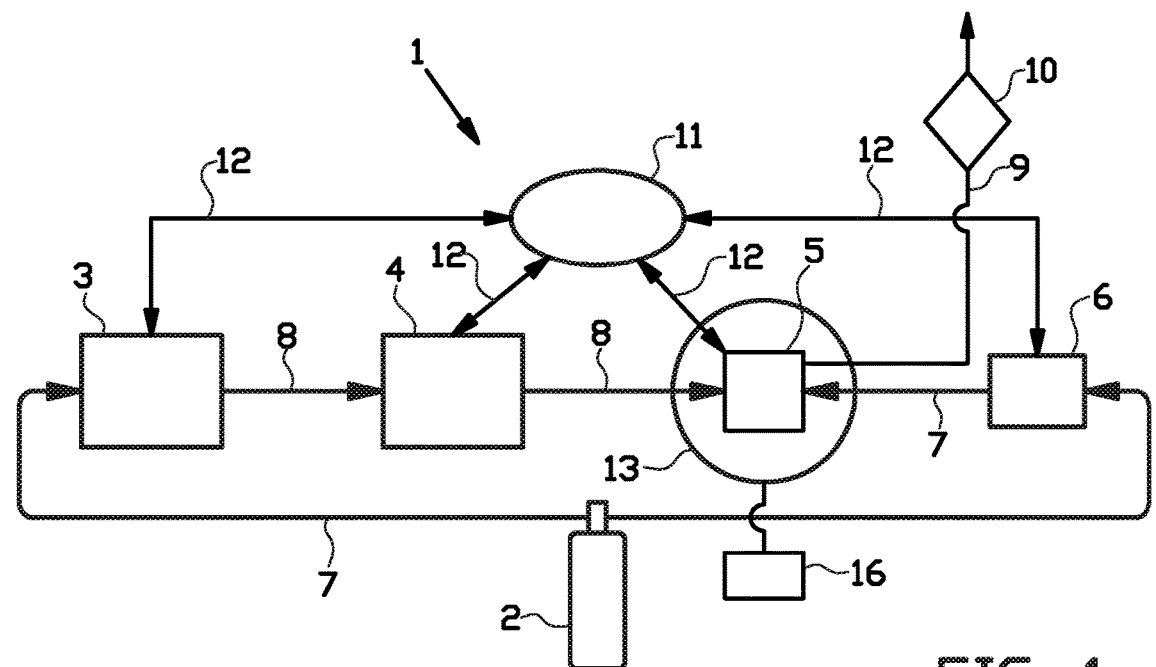
FIG. 1 shows a schematic view of a deposition device for depositing structured material on a target according to an embodiment of the invention.

FIG. 1 shows a schematic view of a deposition device 1 according to an exemplary embodiment of the invention, in particular a structured material printer, more in particular an aerosol jet printer. The deposition device 1 comprises a source of a fluid in particular a gas source 2. On the one hand, the gas source 2 is coupled to a aerosol source 3 via a gas line 7. On the other hand, the gas source 2 is coupled to a gas valve 6 and via the gas valve 6 and a gas line 7 to the deposition unit 5.

In the aerosol source 3, the fluid from the gas source 2 is used as a carrying gas to create an aerosol stream. The stream of aerosol exits the aerosol source 3 and is directed to a modifier 4 for modifying the aerosol stream, if required. From the modifier 4, the aerosol stream is directed to the deposition unit 5. Aerosol lines 8 respectively connect the aerosol source 3 to the modifier 4, and the modifier 4 to the deposition unit 5.

An exhaust line 9 connects the deposition unit 5 via a filtering device 10 to the environment.

The deposition unit 5 is in this example positioned inside a vacuum chamber 13 which is connected to a vacuum pump 16 for reducing the pressure inside the vacuum chamber.

The above mentioned gas source 2 preferably provides an inert gas, more preferably nitrogen or argon. The aerosol source 3 preferably is a nano-aerosol source, more preferably a spark-ablation generator. Preferably the aerosol source 3 is configured to produce or provide an aerosol with aerosol particles having a size which is smaller than 100 nm, and more preferably smaller than 10 nm.

A control unit 11 is connected to the aerosol source 3, the modifier 4, the deposition unit 5 and the gas valve 6 by control lines 12. The control unit 11 is arranged for controlling the deposition process by monitoring and controlling the parameters of the deposition device 1. Preferably the control unit 11 is arranged for taking in-situ measurements of the parameters of the deposition device 1 and for controlling the deposition process in real time.

When the deposition device 1 is in use, the gas source 2 supplies the gas via the gas line 7 to the aerosol source 3. The gas flows through the active aerosol source 3 and picks op particles that are generated by the aerosol source, creating the aerosol stream comprising the gas and the particles. Subsequently the aerosol stream flows via the aerosol line 8 through the modifier 4. The modifier 4 is arranged to modify the aerosol stream, if necessary, to obtain the desired properties thereof. Properties of the aerosol stream that may be modified are, amongst others, particle size of the aerosol particles or agglomerates thereof, shape of the aerosol particles, and particle number concentration. Subsequently the modified aerosol stream flows via the aerosol line 8 to the deposition unit 5 inside the vacuum chamber 13. The vacuum pump 16 provides a vacuum inside the vacuum chamber 13. The vacuum may assist the aerosol stream to flow into the vacuum chamber 13 as will be further explained further down below.

Furthermore the gas source 2 supplies the gas via the gas lines 7 and via the gas valve 6 to the deposition unit 5. The gas valve 6 is in this example embodied as an valve that is arranged to switch the gas flowing to the deposition unit 5 on and off. It is to be understood that multiple gas sources 2 may be used to supply gas to the deposition device 1. The gas that is supplied to the aerosol source 3 may be different from the gas that is supplied to the gas valve 6.

Figure 2:
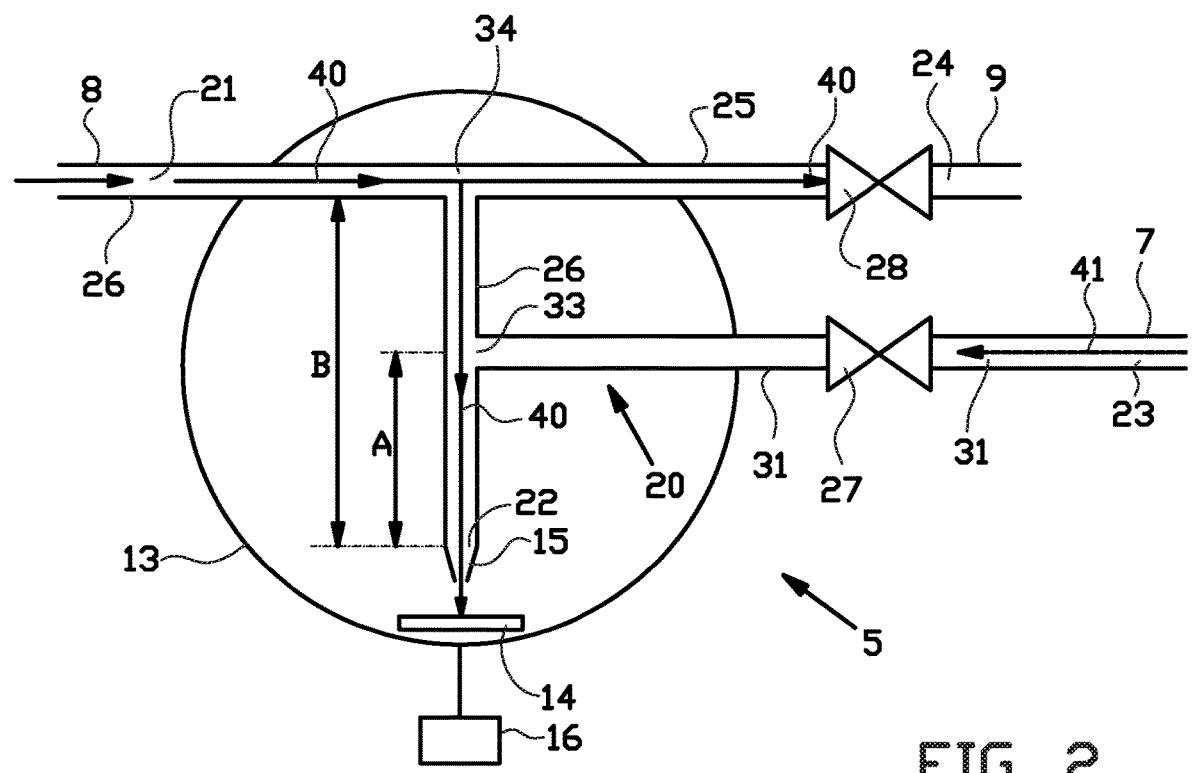
FIG. 2 shows a schematic view of a part of a deposition unit of the deposition device according to FIG. 1 comprising a switching device according to a first example of the invention, wherein the switching device is in a first condition.
Figure 3:
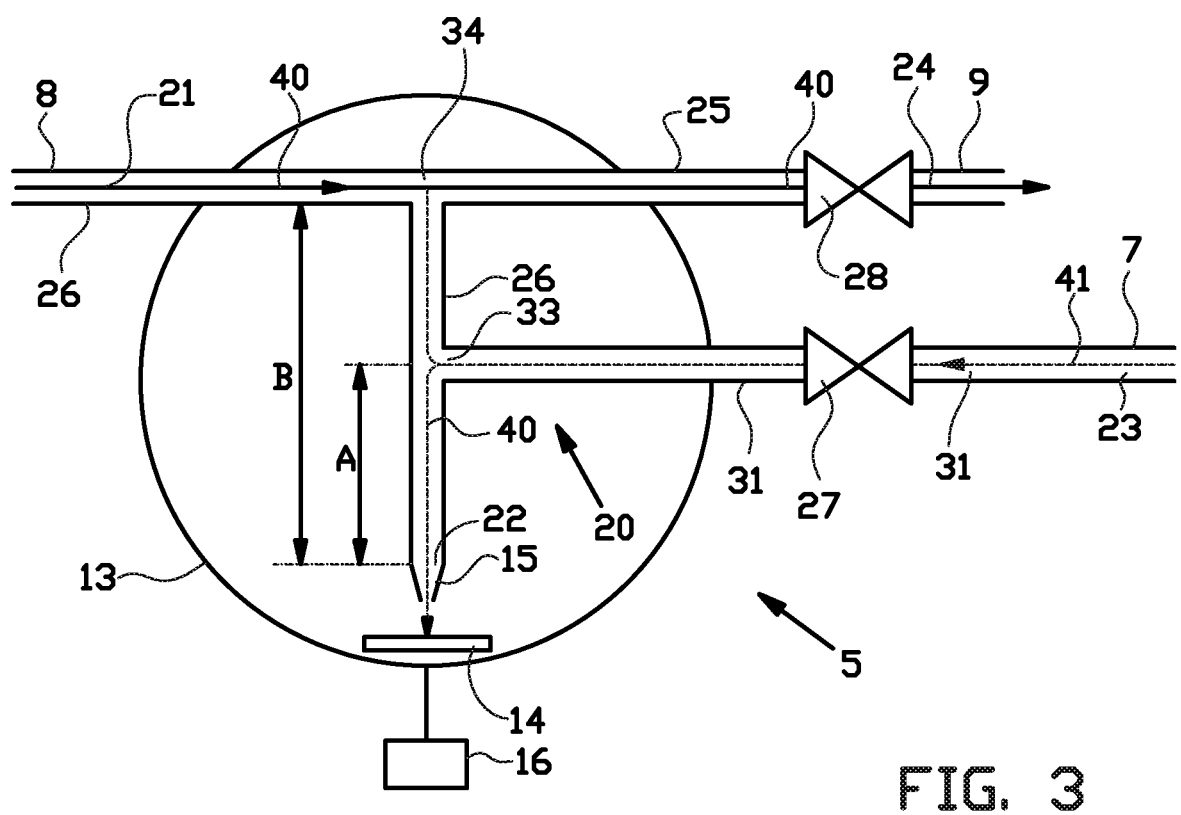
FIG. 3 shows the deposition unit of FIG. 2, wherein the switching device is in a second condition.

FIGS. 2 and 3 show a schematic view of the deposition unit 5 comprising a switching device 20 according to an exemplary embodiment of the invention, and a deposition head or nozzle 15. In this example the deposition unit 5 and the nozzle 15 are arranged inside the vacuum chamber 13. A substrate or target 14 is placed below the nozzle 15 inside the vacuum chamber 13. The nozzle 15 and the target 14 are movable with respect to each other. In this example the target 14 is placed on a not shown stage. The stage is movable in three dimensions with respect to the nozzle 15 in order to adjust the height and location of the nozzle 15 above the target 14.

The switching device 20 comprises a fluid conduit 26 having a first inlet 21 for a fluid, i.e. the aerosol stream 40, and a first outlet 22 that is in fluid connection with the nozzle 15. The switching device 20 further comprises a switching fluid conduit 31 having a second inlet 23 for the gas, and an exhaust conduit 25 having a second outlet 24. The switching fluid conduit 31 is in fluid connection with the fluid conduit 26 at a first position 33. The exhaust conduit 25 is in fluid connection with the fluid conduit 26 at a second position 34 between the first inlet 21 and the first position 33. The first outlet 22 and the first position 33 are spaced apart over a first distance A along the fluid conduit 26, and the first outlet 22 and the second position 34 are spaced apart over a second distance B along the fluid conduit 26. The first inlet 21, the second inlet 23, the first outlet 22 and the second outlet 24 are respectively in fluid connection with the aerosol line 8, the gas line 7 the nozzle 15 and the exhaust line 9.

The switching device 20 furthermore comprises a first valve 27 that controls the flow of gas in the switching fluid conduit 31, and a second valve 28 that controls the flow of gas in the exhaust conduit 25. Preferably the first valve and second valve are connected to the control unit 11.

FIG. 2 schematically shows the switching device 20 in a first condition in which both valves 27, 28 are closed. In this condition, the aerosol stream 40 can only flow from the aerosol line 8, via the fluid conduit 26 to the first outlet 22 and the nozzle 15. At the nozzle 15, the aerosol stream is converted into an aerosol jet, which is directed onto the target 14 for providing the desired deposition of aerosol particles from the aerosol 40 on the surface of the target 14.

FIG. 3 schematically shows the switching device 20 in a second condition in which both valves 27, 28 are open. In this condition, the switching fluid 41 flows through the switching fluid conduit 31 into the fluid conduit 26. On the one hand, the switching fluid 41 blocks the passage of the aerosol stream 40, which aerosol stream 40 is redirected to the exhaust conduit 25. Because the valve 28 is open, the aerosol stream 40 can exit the switching device 20 via the second outlet 24 into the exhaust line 9. On the other hand, the switching fluid 41 is at least partially directed to the first outlet 22 and the nozzle 15. At the nozzle 15, the switching fluid 41 is converted into a jet, which is directed onto the target 14.

Accordingly, in the second condition it is prevented that the aerosol stream 40 reaches the nozzle 15, and it is prevented that aerosol particles from the aerosol 40 are deposited on the surface of the target 14. However, the aerosol stream 40 is not stopped. The aerosol stream 40 can continue to flow, but is redirected by the switching fluid 41 to the second outlet 24. Accordingly, during the switching of the aerosol stream 40 between the first outlet 22 and the second outlet 24, and vice versa, the aerosol source 3 and/or the modifier 4 do not need to change their working conditions and can still provide a continuous and stable aerosol flow.

Figure 4:
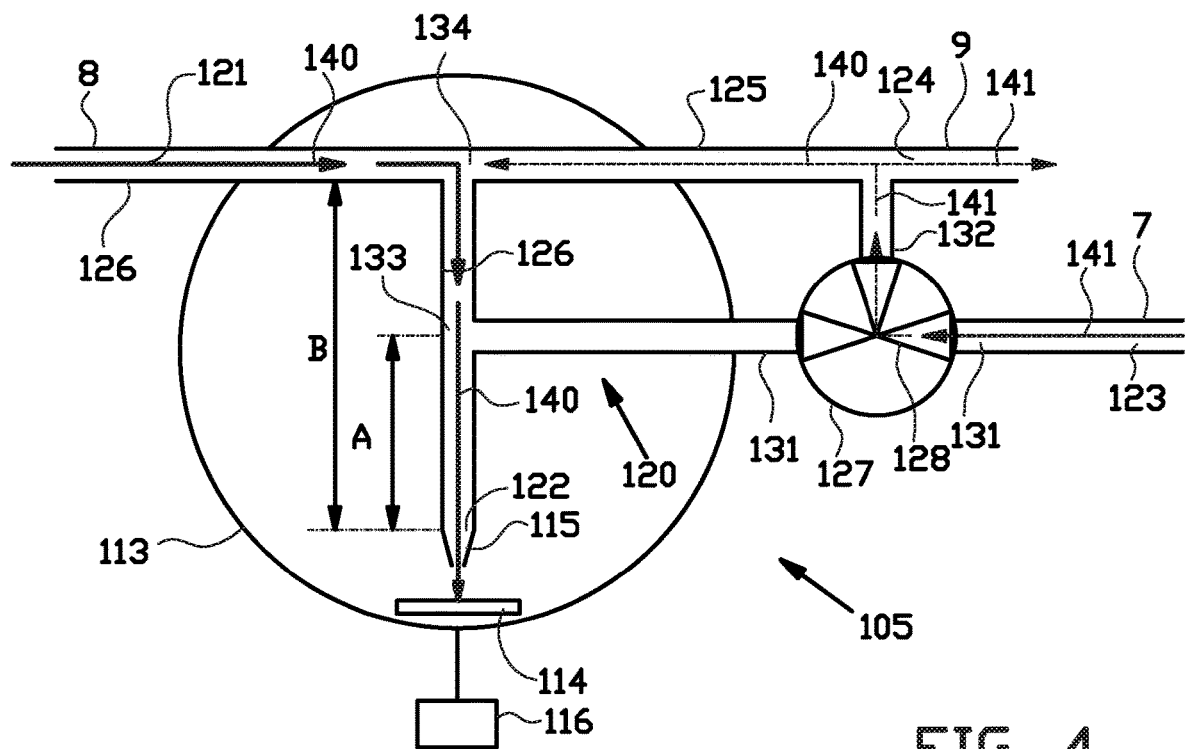
FIG. 4 shows part of a deposition unit comprising a switching device according to a second example, wherein the switching device is in a first condition.
Figure 5:
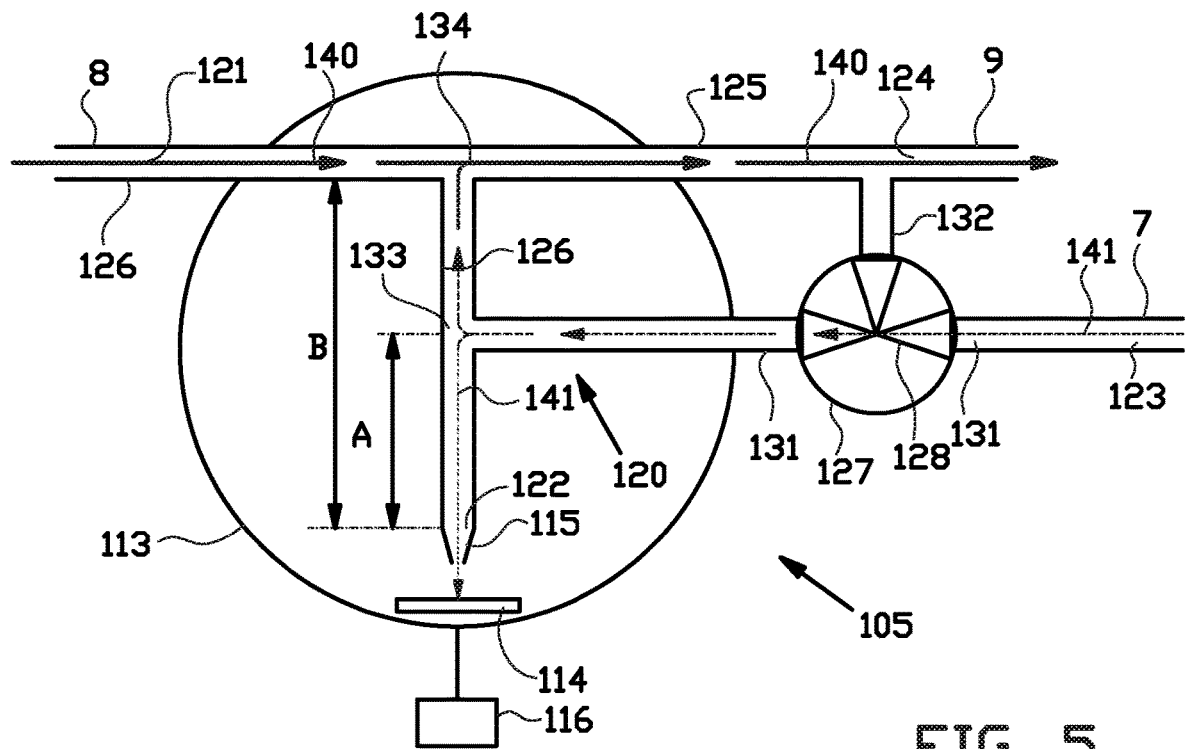
FIG. 5 shows the deposition unit of FIG. 4, wherein the switching device is in a second condition.

FIGS. 4 and 5 show a schematic view of the deposition unit 105 comprising a switching device 120 according to a second exemplary embodiment of the invention, and a deposition head or nozzle 115. In this example the deposition unit 105 and the nozzle 115 are arranged inside the vacuum chamber 113. A substrate or target 114 is placed below the nozzle 115 inside the vacuum chamber 113. The nozzle 115 and the target 114 are movable with respect to each other. In this example the target 114 is placed on a not shown stage. The stage is movable in three dimensions with respect to the nozzle 115 in order to adjust the height and location of the nozzle 115 above the target 114.

The switching device 120 comprises a fluid conduit 126 having a first inlet 121 for a fluid, i.e. the aerosol stream 140, and a first outlet 122 that is in fluid connection with the nozzle 115. The switching device 120 further comprises a first switching fluid conduit 131 having a second inlet 123 for the gas, and an exhaust conduit 125 having a second outlet 124. The first switching fluid conduit 131 is in fluid connection with the fluid conduit 126 at a first position 133. The first switching fluid conduit 131 discharges, preferably directly, into the fluid conduit 126. The exhaust conduit 125 is in fluid connection with the fluid conduit 126 at a second position 134 between the first inlet 121 and the first position 133. The first outlet 122 and the first position 133 are spaced apart over a first distance A along the fluid conduit 126, and the first outlet 122 and the second position 134 are spaced apart over a second distance B along the fluid conduit 126. The switching device 120 according to this example further comprises a second switching conduit 132 which provides a fluid connection between the first switching conduit 131 and the exhaust conduit 125. The first inlet 121, the second inlet 123, the first outlet 122 and the second outlet 124 are respectively in fluid connection with the aerosol line 8, the gas line 7 the nozzle 115 and the exhaust line 9.

The switching device 120 furthermore comprises a control device 127, which control device 127 in this example comprises a valve 128, more specifically a three-way valve, which is arranged at the branch point between the first switching conduit 131 and the second switching conduit 132. The control device 127 may switch the valve 128 between a first condition and a second condition.

In the first condition, as schematically shown in FIG. 4, a fluid connection is established between the gas line 7 and the exhaust conduit 125, via the second switching conduit 132. In use, the switching fluid 141 is guided into the exhaust conduit 125. The switching fluid 141 blocks the passage of the aerosol stream 140 into the exhaust conduit 125, and the aerosol stream 140 is directed to pass along the fluid conduit 126 towards the first outlet 122 and the nozzle 115. At the nozzle 115, the aerosol stream is converted into an aerosol jet, which is directed onto the target 114 for providing the desired deposition of particles from the aerosol 140 on the surface of the target 114. Preferably, the pressure of the switching fluid 141 is configured to direct substantially the complete aerosol stream 140 towards the nozzle. However, in use, the aerosol stream 140 may not be completely blocked by the switching fluid 141, and a part of the aerosol stream 140 may still be flowing through the exhaust conduit 125 to the second outlet 124 in the first condition.

In the second condition, as schematically shown in FIG. 5, a fluid connection is established between the gas line 107 and the fluid conduit 126. In this condition, the switching fluid 141 flows through the switching fluid conduit 131 into the fluid conduit 126. On the one hand, the switching fluid 141 blocks the passage of the aerosol stream 140, which aerosol stream 140 is redirected to the exhaust conduit 125. The aerosol stream 140 can exit the switching device 120 via the second outlet 124 into the exhaust line 9. On the other hand, the switching fluid 141 is at least partially directed to the first outlet 122 and the nozzle 115. At the nozzle 115, the switching fluid 141 is converted into a jet, which is directed onto the target 114.

Accordingly, in the second condition it is prevented that the aerosol stream 140 reaches the nozzle 115, and it is prevented that aerosol particles from the aerosol 140 are deposited on the surface of the target 114. However, the aerosol stream 140 is not stopped. The aerosol stream 140 can continue to flow, but is redirected by the switching fluid 141 to the second outlet 124. Accordingly, during the switching of the aerosol stream between the first outlet 122 and the second outlet 124, and vice versa, the aerosol source 3 and/or the modifier 4 do not need to changed their working conditions and can still provide a continuous and stable aerosol flow. Preferably, the pressure of the switching fluid 141 is configured to effectively block the aerosol stream 140 at least in the second condition. More preferably, the pressure of the switching fluid 141 is configured such that a part of the switching fluid 141 may be flowing together with the aerosol stream 140 through the exhaust conduit 125 to the second outlet 124.

At least in the above examples, the flow rate of the aerosol stream is preferably 1-10 liters/minute. In the first condition, the aerosol stream 40, 140 flows from the first inlet 21, 121, via the fluid conduit 26, 126, via the first outlet 22, 122 through the nozzle 15, 115, which nozzle 15, 115 directs the aerosol stream 40, 140 onto the target 14, 114 to deposit the aerosol particles thereon. A layer of material, in particular a structured layer of aerosol particles is formed on the target 14, 114 by moving the stage and therewith the target 14, 114 with respect to the nozzle 15, 115, which allows to provide lines and/or patterns on the target 14, 114 by the deposited aerosol particles. The feature size of the printed structured lines and patterns preferably is smaller than 1 mm and more preferably is smaller than 100 µm.

Figure 6:
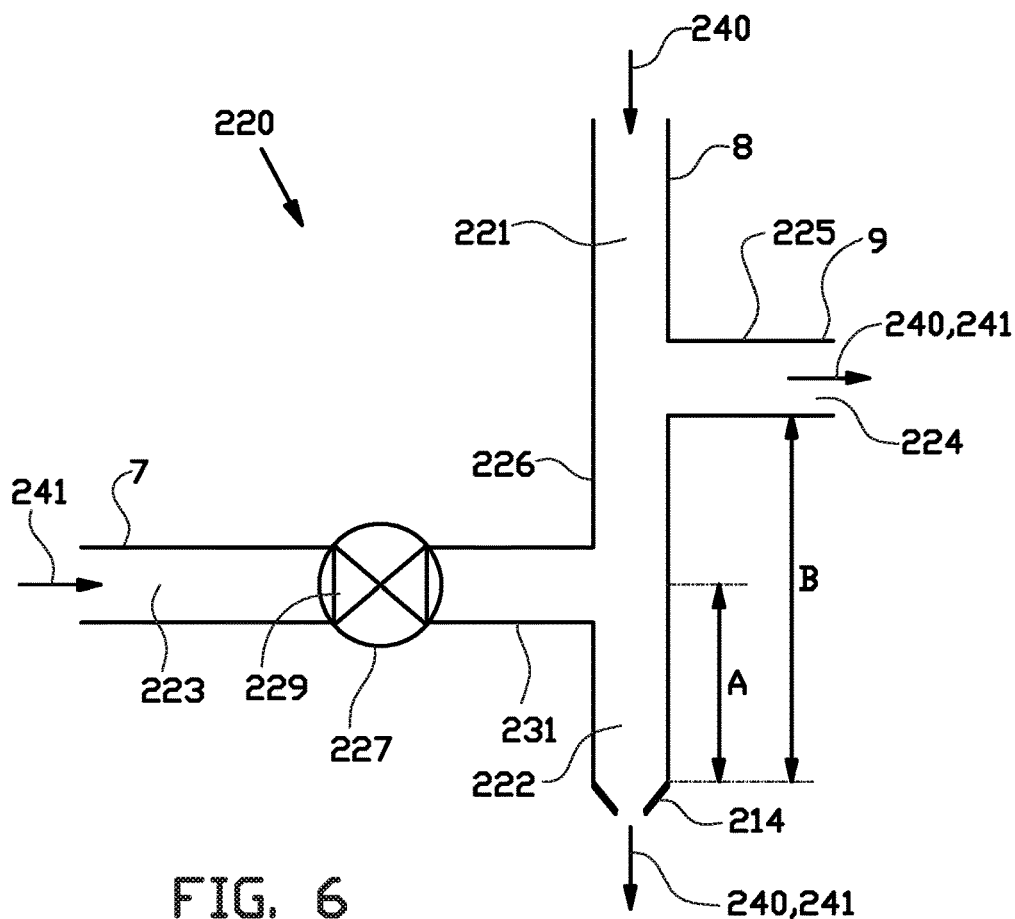
FIG. 6 shows a schematic view of a switching device according to an alternative example of the invention.

FIG. 6 shows a simplified example of a switching device 220. As shown, the switching device 220 may also be embodied without the second valve 28 or the second gas conduit 132. This embodiment is particularly suitable for use in a vacuum chamber.

Preferably, the deposition of the particles from the aerosol stream 240 is performed in a clean environment in order to prevent that deposited material becomes contaminated by particles from the environment. On way to provide a clean environment is, to perform the deposition in a vacuum chamber where the ambient air and any contamination is removed to a large extend. When using the deposition unit in a vacuum chamber, a vacuum inside the vacuum can assist that the aerosol stream 240 flows to and through the nozzle 215 because the pressure inside the switching device 220 is higher than the pressure outside the nozzle 215. Since the pressure inside the vacuum chamber is also lower than the pressure in the exhaust conduit, the aerosol stream 240 will predominantly flow through the fluid conduit 226 towards the nozzle 215. The pressure inside the vacuum chamber is preferably equal to or lower than 10 mbar, preferably equal to or lower than 1 mbar. It is to be understood that the pressure difference may be obtained in other ways.

The control device 227 comprises a valve 229. The control device 227 may switch the valve 229 between a first condition wherein the valve 229 is closed and obstructs the switching fluid conduit 231, and a second condition wherein the valve 229 is open and allows a switching fluid 241 to pass into the fluid conduit 226 via the switching fluid conduit 231.

When the switching device 220 is in the first condition, the switching fluid conduit 231 is blocked by the valve 229. Accordingly, the flow of switching fluid 241 is blocked. The aerosol stream 240, which is introduced in the switching device 220 via the first inlet 221, flows through the fluid conduit 226. At least a first part of the aerosol stream 240 flows to the first outlet 222 and through the nozzle 214 for depositing the aerosol particles of said first part of the aerosol stream 240 on a target (not shown). A second part of the aerosol stream 240 may flow through the exhaust conduit 225. Preferably the deposition device is configured to minimize this second part of the aerosol stream 240.

When the switching device 220 is in the second condition, the switching fluid 241 can pass into the fluid conduit 226. On the one hand, the switching fluid 241 is configured to block the passage of the aerosol stream 240, which aerosol stream 240 is redirected to the exhaust conduit 225. On the other hand, the switching fluid 241 is at least partially directed to the first outlet 222 and the nozzle 214.

Accordingly, in the second condition it is prevented that the aerosol stream 240 reaches the nozzle 214, and it is prevented that aerosol particles from the aerosol 240 are deposited on the surface of the target. However, the aerosol stream 240 is not stopped. The aerosol stream 240 can continue to flow, but is redirected by the switching fluid 241 to the second outlet 224. Accordingly, during the switching of the aerosol stream 240 between the first outlet 222 and the second outlet 224, and vice versa, the aerosol source 3 and/or the modifier 4 do not need to change their working conditions and can still provide a continues and stable flow aerosol.

In addition, if the pressure of the switching fluid 241 and/or of the aerosol stream 240 is/are set correctly, the flow profile of the jet from the nozzle 214 is substantially not disturbed. In order to minimize the disturbance of the jet from the nozzle 214, the same fluid, in particular the same gas is used for the switching fluid and the carrier fluid of the aerosol.

When switching the flow of the aerosol stream 240 from the first outlet 222 to the second outlet 224, i.e. switching the fluid stream 240 to stop flowing through the nozzle 214, the switching gas stream 241 forces the aerosol stream 240 from the first outlet 222 towards the exhaust conduit 225. A part of the aerosol stream 240 that already passed the entrance of the switching fluid conduit 232 continues to flow to and through the nozzle 214 over a small delay period after switching the aerosol stream 240. This delay period is at least partly related to the first distance A along the fluid conduit 226. To minimize the delay period the distance A should be as small as possible, preferably smaller than 10 cm, preferably between 0.2 and 10 cm, more preferably between 0.5 and 2 cm.

In addition, also the distance between the valve 229 and the fluid conduit 226 is preferably as small as possible in order to minimize the delay period after switching the aerosol stream 240 by means of the switching fluid 241.

When the switching device 220 switches the flow of the fluid stream 240 from the second outlet 224 to the first outlet 222, i.e. switching the fluid stream 240 to flow through the nozzle 214, the switching gas stream 241 is stopped and the aerosol stream 240 is allowed to flow from the entrance of the exhaust conduit 225 towards the first outlet 222. The aerosol stream 240 flows from the entrance of the exhaust conduit 225 to the first outlet 222 over a small delay period after switching the aerosol stream 240. This delay period is at least partly related to the second distance B along the fluid conduit 226. To minimize the delay period the distance B should be as low as possible, preferably smaller than 20 cm, more preferably between 1 and 20 cm.

It is to be understood that the deposition unit 5 may comprise multiple nozzles which are arranged in fluid connection to the first outlet of the switching device to deposit structured material onto the target or on multiple targets simultaneously. Alternatively each of the multiple nozzles may be arranged in fluid connection to the first outlet of a corresponding switching device to deposit structured material onto the target or on multiple targets independently from each other.

Figure 7:
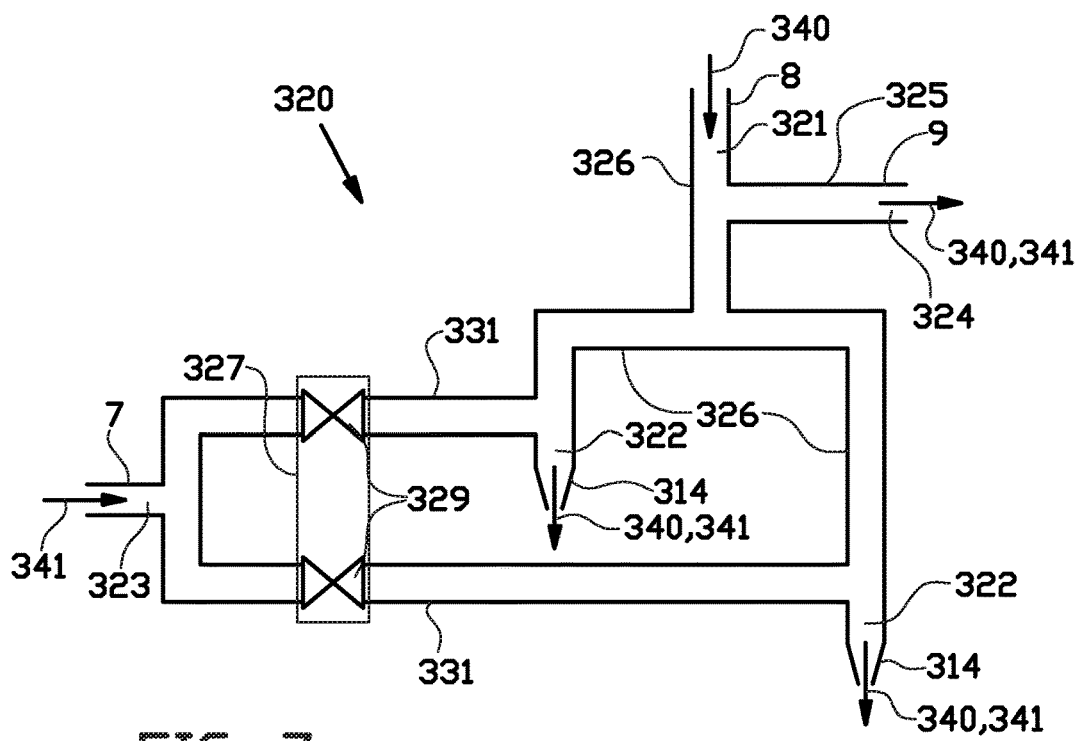
FIG. 7 shows a schematic view of a switching device according to another example of the invention.

An example of a switching device 320 for multiple nozzles 314 is shown in FIG. 7. The fluid conduit 326 comprises multiple first outlets 322, wherein the switching fluid conduit 331 is arranged in fluid connection with the fluid conduit 326 at multiple first positions between corresponding first outlets 322 and the first inlet 321, and each of the multiple nozzles 314 is arranged in fluid connection to one of the multiple first outlets 322.

The switching device 320 furthermore comprises a control unit 327 comprising set of valves 329 that controls the flow of gas in each of the switching fluid conduits 331. By controlling each valve 329, the flow of the aerosol stream 340 through each corresponding first outlet 322 and corresponding nozzle 314 can be controlled. A part of the aerosol stream 340 that has been blocked by the switching fluid 341, is redirected to the exhaust conduit 325. Although FIG. 7 shows an embodiment with one exhaust conduit 325, the switching device 320 may also comprise a separate exhaust conduit corresponding to each first outlet 322.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, the control device, in particular the valves 27, 28, 128, 229, 329, of the above described examples may also be configured to provide that the switching fluid is introduced into the fluid conduit in order not to switch the aerosol stream, but to dilute the aerosol stream which exits the switching device via the first outlet.

In summary, the present invention relates to a switching device for switching the flow of a fluid, wherein the switching device comprises a fluid conduit comprising a first inlet for said fluid and a first outlet, a first switching fluid conduit comprising a second inlet for a switching fluid, which first switching fluid conduit is configured in fluid connection with the fluid conduit at a first position between the first inlet and the first outlet, an exhaust conduit comprising a second outlet, which exhaust conduit is configured in fluid connection with the fluid conduit at a second position between the first inlet and the first position, and a control device configured for controlling the flow of the switching fluid into the fluid conduit.

The invention claimed is:

1. A switching device for switching flow of a fluid, the switching device comprising:
   a fluid conduit comprising a first inlet for said fluid and a first outlet,
   a first switching fluid conduit comprising a second inlet for a switching fluid, the first switching fluid conduit being configured in fluid connection with the fluid conduit at a first position between the first inlet and the first outlet,
   an exhaust conduit comprising a second outlet, the exhaust conduit being configured in fluid connection with the fluid conduit at a second position between the first inlet and the first position, and
   a control device configured for controlling the flow of the switching fluid into the fluid conduit,
   wherein the switching device further comprises a second switching fluid conduit which is configured in fluid connection with the exhaust conduit and the first switching fluid conduit,
   wherein the control device is configured for controlling the flow of the switching fluid into the first switching fluid conduit and/or the second switching fluid conduit, and
   wherein the control device has a first condition, in which the control device is configured for substantially preventing all flow of fluid to enter the fluid conduit at the first position, and a second condition, in which the control device is configured to allow a flow of the switching fluid into the fluid conduit.

2. The switching device according to claim 1, wherein the first switching fluid conduit discharges into the fluid conduit.

3. The switching device according to claim 1, wherein the control device comprises a valve.

4. The switching device according to claim 1, wherein a first distance along the fluid conduit between the first outlet and the first position is smaller than 10 cm.

5. The switching device according to claim 1, wherein a second distance along the fluid conduit between the first outlet and the second position is smaller than 20 cm.

6. A deposition device, wherein the deposition device comprises a nozzle for directing an aerosol stream onto a target and a switching device according to claim 1,
wherein the nozzle is arranged in fluid connection to the first outlet.

7. The deposition device according to claim 6, wherein the deposition device further comprises a source of the aerosol stream,
wherein the source of the aerosol stream is arranged in fluid connection to the first inlet.

8. The deposition device according to claim 6, wherein the particle size of the aerosol particles in the aerosol stream is smaller than 100 nm.

9. The deposition device according to claim 6, wherein the deposition device is configured for depositing features onto the target,
wherein a feature size of the deposited features is smaller than 1 mm.

10. The deposition device according to claim 6, wherein the deposition device further comprises a source of the switching fluid,
wherein the source of the switching fluid is arranged in fluid connection to the second inlet.

11. The deposition device according to claim 10, wherein the switching fluid comprises a gas.

12. The deposition device according to claim 6, wherein the deposition device further comprises a filtering device,
wherein the filtering device is arranged in fluid connection with the exhaust conduit.

13. The deposition device according to claim 6, wherein the deposition device comprises multiple nozzles, each arranged in fluid connection to the first outlet of the switching device, or each arranged in fluid connection to the first outlet of a corresponding switching device.

14. The deposition device according to claim 13, wherein the fluid conduit comprises multiple first outlets, the first switching fluid conduit is arranged in fluid connection with the fluid conduit at multiple first positions between corresponding first outlets and the first inlet, and each of the multiple nozzles is arranged in fluid connection to one of the multiple first outlets.

15. A method for switching the flow of a fluid with the use of a switching device according to claim 1, wherein the method comprises the steps of:
supplying said fluid to the first inlet, and guiding the fluid from the first inlet, via the fluid conduit to the first outlet,
controlling the control device to allow the switching fluid to flow into the fluid conduit, thereby guiding the switching fluid from the second inlet, via the first switching fluid conduit, via the fluid conduit, at least partially to the first outlet, and guiding the fluid from the first inlet, via the fluid conduit, via the exhaust conduit, at least partially to the second outlet,
wherein the method further comprises the step of guiding the switching fluid from the second inlet, via the first switching fluid conduit, via the second switching fluid conduit, via the exhaust conduit, to the second outlet.

16. The method according to claim 15, wherein the method further comprises the step of guiding the switching fluid from the second inlet, via the switching fluid conduit, at least partially via the exhaust conduit, to the second outlet.

17. The method for depositing aerosol particles onto a target with the use of the deposition device according to claim 6, wherein the method comprises the steps of:
supplying an aerosol to the first inlet, guiding the aerosol from the first inlet, via the fluid conduit, via the first outlet, through the nozzle onto said target,
controlling the control device to allow the switching fluid to flow into the fluid conduit, and thereby guiding the switching fluid from the second inlet, via the first switching fluid conduit, via the fluid conduit at least partially to the first outlet, and guiding the aerosol from the first inlet, via the fluid conduit, via the exhaust conduit, to the second outlet,
wherein the method further comprises the step of guiding the switching fluid from the second inlet, via the first switching fluid conduit, via the second switching fluid conduit, via the exhaust conduit, to the second outlet.

18. The method according to claim 17, wherein the method further comprises the step of partly guiding the switching fluid from the second inlet, via the switching fluid conduit, via the exhaust conduit, to the second outlet.

19. The switching device according to claim 1, wherein the first switching fluid conduit discharges directly into the fluid conduit.

20. The switching device according to claim 1, wherein a first distance along the fluid conduit between the first outlet and the first position is between 0.2 and 10 cm.

21. The switching device according to claim 1, wherein a first distance along the fluid conduit between the first outlet and the first position is between 0.2 and 2 cm.

22. The switching device according to claim 1, wherein a second distance along the fluid conduit between the first outlet and the second position is between 0.2 and 20 cm.

23. The switching device according to claim 1, wherein a second distance along the fluid conduit between the first outlet and the second position is between 0.2 and 2 cm.

24. The deposition device according to claim 6, wherein the particle size of the aerosol particles in the aerosol stream is smaller than 10 nm.

25. The deposition device according to claim 6, wherein the deposition device is configured for depositing features onto the target,
wherein a feature size of the deposited features is smaller than 100 μm.

26. The deposition device according to claim 10, wherein the switching fluid comprises a substantially inert gas.

27. The deposition device according to claim 10, wherein the switching fluid comprises nitrogen or argon gas.

* * * * *